(No Model.)  L. BAGGER.  3 Sheets—Sheet 1.
CARBURETOR.
No. 301,790.  Patented July 8, 1884.
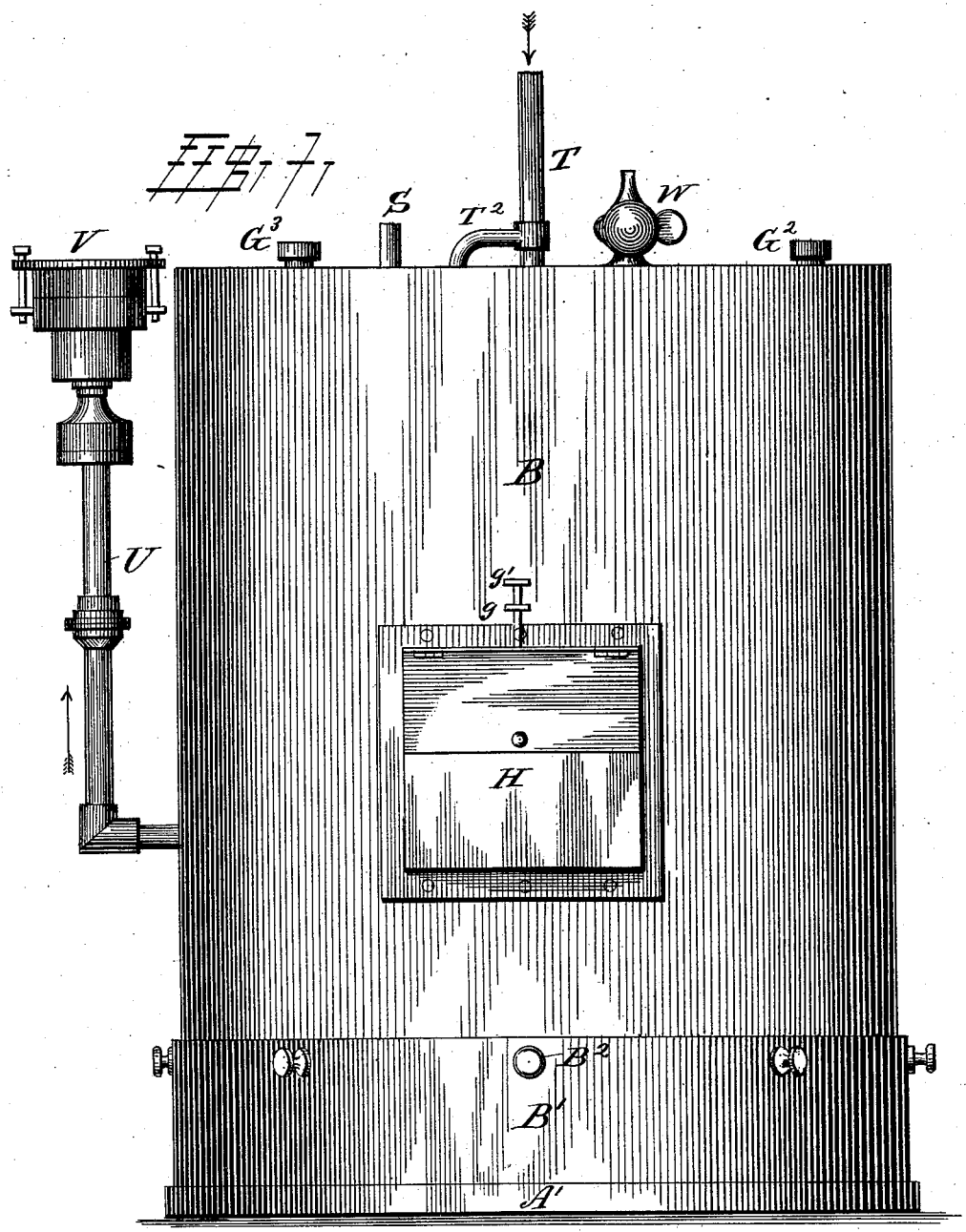
WITNESSES:
Fred. G. Dieterich.
Arthur L. Morsell.
INVENTOR.
Louis Bagger
By Louis Bagger & Co.
ATTORNEYS.

(No Model.) 3 Sheets—Sheet 2.
L. BAGGER.
CARBURETOR.
No. 301,790. Patented July 8, 1884.
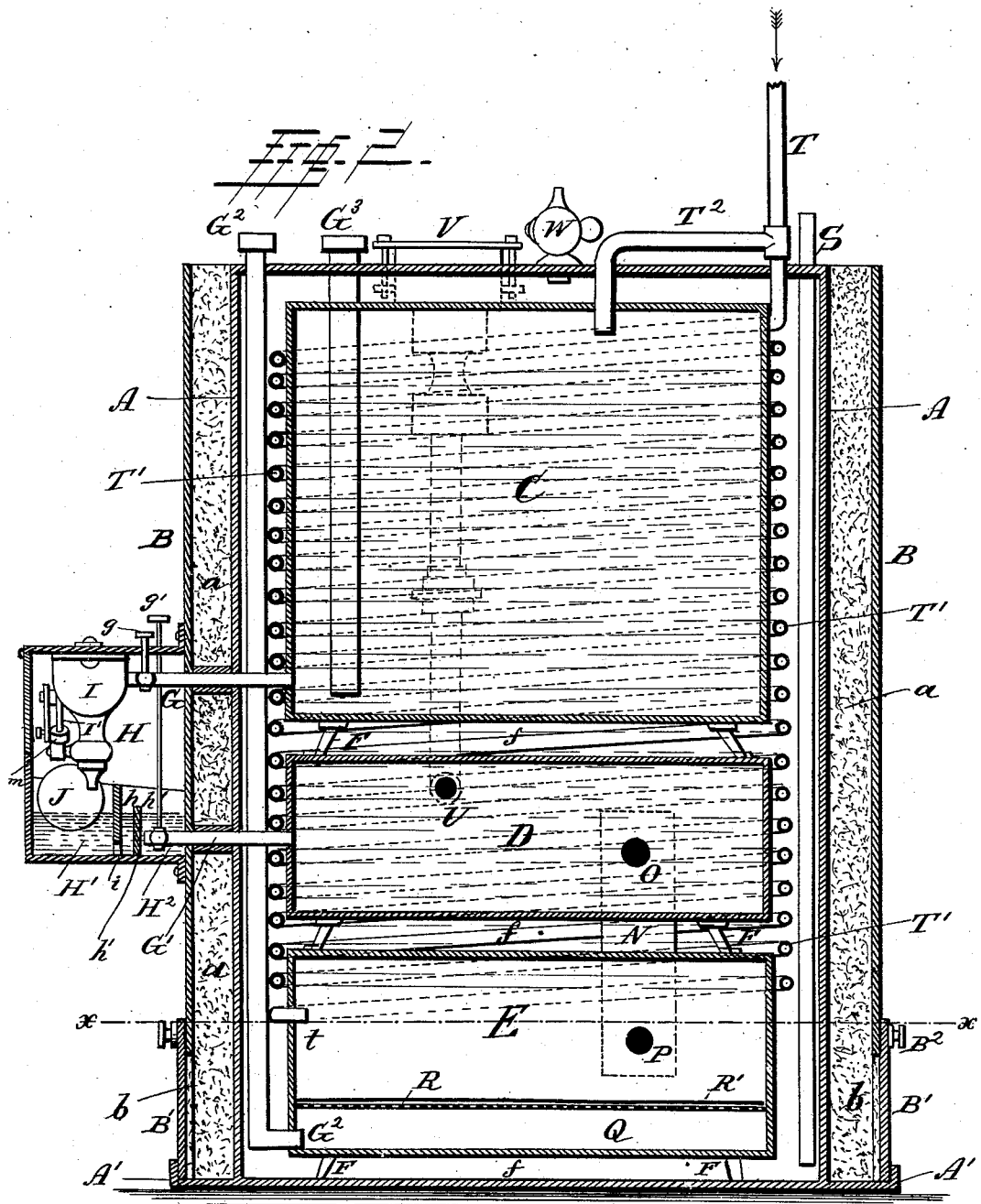
WITNESSES:
Fred. G. Dieterich.
Arthur L. Morrell.
INVENTOR.
Louis Bagger
By Louis Bagger & Co.
ATTORNEYS.

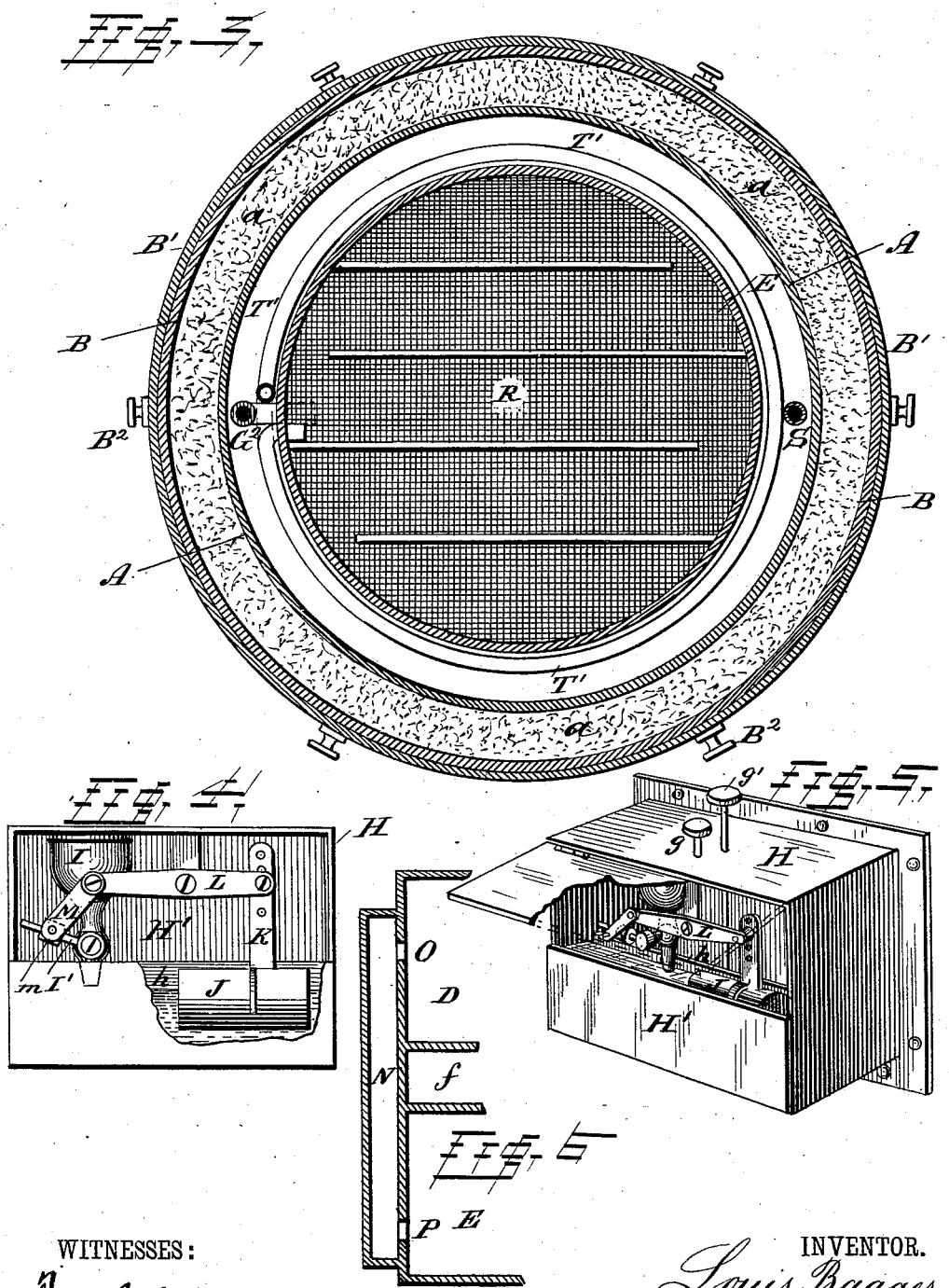

UNITED STATES PATENT OFFICE.

LOUIS BAGGER, OF WASHINGTON, DISTRICT OF COLUMBIA, ASSIGNOR OF THREE-FOURTHS TO C. EATON CREECY AND WILLIAM O. AVERY, BOTH OF SAME PLACE, AND JOHN A. HAYDON, OF FREDERICK, MARYLAND.

CARBURETOR.

SPECIFICATION forming part of Letters Patent No. 301,790, dated July 8, 1884.

Application filed January 11, 1884. (No model.)

*To all whom it may concern:*

Be it known that I, LOUIS BAGGER, a citizen of the United States, and a resident of the city of Washington, in the District of Columbia, have invented certain new and useful Improvements in Carburetors; and I do hereby declare that the following is a full, clear, and exact description of the invention, which will enable others skilled in the art to which it appertains to make and use the same, reference being had to the accompanying three sheets of drawings, which form a part of this specification, and in which—

Figure 1 is a side elevation of my improved carbureter. Fig. 2 is a vertical sectional view of the same. Fig. 3 is a horizontal section through the plane indicated by the broken line $x$ $x$ in Fig. 2, and Figs. 4, 5, and 6 are detail views of parts of the apparatus.

Like letters of reference indicate corresponding parts in all the figures.

My invention has relation to apparatus or machines for carbureting air or gas, and more especially to carburetors for the enrichment or improvement of illuminating-gas. As is well known, in order to obtain satisfactory results from carbureted illuminating-gas and prevent a smoking flame, as well as the condensation of supercharged gas in the pipes, it is of the utmost importance that the mechanical admixture of the vapors of the hydrocarbon, or other volatile fluid used in the carburetor, with the illuminating-gas to be enriched or improved thereby, should take place at a coincident temperature of the two gases to be mixed—that is to say, the air or gas, as the case may be, should be fed to the gasoline, naphtha, benzole, or other carbureting-fluid, at a temperature exactly coincident with or equal to the temperature of the vapors or gases which result from the volatilization or evaporation of the hydrocarbon or other carbureting material used in the machine.

My improvement consists, therefore, first, in the means whereby I equalize the temperature of the air or gas which is to be enriched, and of the hydrocarbon vapors by which the enrichment is to be effected; secondly, in the means for maintaining an equable temperature in the apparatus and in the water-jacket or safety-jacket surrounding the same and forming a part thereof; and, thirdly, in the improved construction and combination of parts of the machine, as hereinafter more fully described, whereby the same as a whole is rendered absolutely safe, capable of producing lights without smoking, economical in its management, and simple and durable in its construction.

On the accompanying three sheets of drawings, A denotes a tank or casing made of galvanized sheet-iron or other suitable material, and preferably, but not necessarily, in the shape of a cylinder. This tank is closed at the top, and forms what is called the "water-jacket" or "safety-jacket" of the machine.

B is an outer larger casing, which may be of sheet metal, wood, vulcanized fiber, or any other suitable material. This outside casing or envelope, however, does not extend all the way down to the bottom of tank A, but leaves an annular open space, $b$, near its lower end, which is closed by a sleeve or cylinder, B', adapted to slide up and down upon the cylinder B, and provided with handles B², by means of which it may readily be lifted when desired. The lower end of this movable part B' rests in the flanged extension A' of the bottom of jacket A, thus forming, with the upper casing or envelope, B, an annular space, $a$, encircling the water-jacket on all sides. This space is packed with charcoal, ashes, sawdust, ricehulls, bran, or any other suitable material that is a poor conductor of heat; and if, through leaks in the water-jacket or from other causes, this filling or packing should ever become damp and useless, it may readily be removed by lifting up the sliding part B' and picking it out by a poker or any other suitable utensil, and then, after the sleeve has been let down again, fresh filling may be put in from the top; and this refilling, it will be seen, can be done at any time and without in the least disturbing the other parts of the apparatus. The outer casing, B, is supported upon the bottom A', by three or more legs (not shown in the drawings) placed equal distances apart.

In the top part of tank A, and entirely surrounded by the water, is the gasoline tank or holder C, from which the gasoline, naphtha, benzole, or other volatile fluid used in the machine is fed to the carbureting-chambers D and E. In the drawings I have shown two of these carbureting-chambers separated by an intermediate water-space; but only one carbureting-chamber may be used, or three or more separate chambers may be used, if desired, according to the capacity which the machine is to have, or according to the number of lights to be supplied from a given machine, as one or more of the chambers may be disconnected from the rest, thereby reducing the capacity of the machine. The carbureting-chambers, as well as the gasoline-holder, consist of separate tanks or boxes, of copper or other suitable material, supported upon one another by feet F, so as to leave open spaces $f$ between them, through which the water in tank A may freely circulate. These feet may either be fastened permanently to the bottoms of their respective tanks, or they may be fitted removably into sockets, in the same manner as ordinary stove-legs; or, instead of using the feet or supports described, the carbureting-chambers and gasoline-holder may rest upon ledges or projecting brackets on the inside of tank A, arranged a suitable distance apart, which will answer the same purpose, means being provided in both cases for preventing lateral displacement of the chambers when the machine is moved from place to place.

The gasoline (I use that expression for convenience, although not confining myself to that or any other carbureting material) is fed from the reservoir or holder C to the upper carbureting-chamber, D, through a pipe, G, and the flow is regulated or controlled automatically with absolute accuracy in a very simple manner by means of the valve-and-float mechanism, which I have illustrated more fully in Figs. 4 and 5 on Sheet 3 of the drawings. This regulating apparatus, which is located in a box, H, attached to one side of the machine, consists of a feed valve or faucet, I, at the outer end of the feed-pipe G, and opening with its lower end into a chamber or compartment, H', in the bottom of box H, which is separated by a vertical diaphragm or partition, $h$, from an adjacent compartment, $H^2$, which communicates with the carbureting-chamber D by a pipe, G'. The feed-pipe G has a stop-cock, $g$, and the supply-pipe G' has a stop-cock, $g'$, both of which may be operated from the outside of box H, so that the flow of gasoline may be shut off entirely or regulated at will without opening box H. The chambers H' and $H^2$ in the bottom of box H communicate with each other through a slot or series of holes, $i$, in the bottom of the partition $h$, and in the outer compartment, H', is placed a float, J, the arm or stem K of which has a series of apertures, by means of which it may be attached adjustably to one end of a lever, L, the other end of which is connected adjustably, by means of a link, M, and adjustable sleeve $m$, to the arm I' of the faucet-valve, through which the gasoline is fed into the chamber or compartment H'. As the float is raised by the flow of gasoline into this chamber, the supply-valve I is gradually closed, and, conversely, as oil is fed from chamber H' into the adjacent compartment $H^2$ and through pipe G' into the carbureting-chamber, thus lowering the level of gasoline in compartments H' and $H^2$, and thereby gradually sinking the float, the supply-valve will be gradually opened, so as to replenish the supply of gasoline. Thus it will be seen that the supply of hydrocarbon to the carbureting chamber or chambers is regulated automatically, and that the level of gasoline in the supply-chambers H' and $H^2$ will always remain uniform.

It will further be seen that the "head" of gasoline in the supply-chambers may be regulated by regulating the position of float J upon lever L, and also by regulating valve I by adjusting the sliding sleeve $m$ upon arm I', which opens and closes the valve, and access to this regulating mechanism may be had at any time by opening one side of box H, which is provided with a suitable air-tight door or cover for that purpose. The flow of gasoline may further be regulated at will, or shut off altogether, by properly adjusting the supply-valves $g$ and $g'$.

The gasoline is fed into the receiver or gasoline-holder C through the pipe $G^2$, which is sealed by a closely-fitting screw-cap at the top, and the air or gas to be carbureted is fed through the pipe T, entering through the top of the water-jacket, and bent to form a coil or worm, T', in the water-space encircling the gasoline-holder and the carbureting-chambers. Thus it will be seen that the air or gas, as it passes through the worm or coiled feed-pipe T', the coils of which are immersed into the water in the jacket or tank A, into which the gasoline-holder and carbureting-chambers are also immersed, will assume the same temperature as the contents of the gasoline-holder and carbureting-chambers, so that the air or gas, as it escapes into the lower carbureting-chamber, E, through the outlet $t$, will be of a temperature coincident with the temperature of the hydrocarbon vapors in the carbureting-chambers. The gas-pipe T has a branch pipe, $T^2$, extending down into the top of the gasoline-holder C, so that in case of intense heat from fire and the boiling of the gasoline in the holder or receiver the vapors are allowed to escape through this branch pipe $T^2$ into the feed-pipe, and thence backward through the meter into the street gas-main, thereby preventing all danger of the machine from exploding and increasing the conflagration. The feed-pipe T should of course be provided with a suitably-located stop-cock for shutting off or regulating the flow of gas into the machine. The gasoline fed into the carbureting-chamber D, as it rises in the said chamber, is fed through the opening O and overflow-pipe N into the lower carbureting-chamber, E, through the opening or outlet P at the lower end of said pipe. The surplus gasoline or the residuum will filter through the false wire bottom or foraminated bottom R into the collecting-reservoir Q at the bottom of the machine, which, it will be seen, is entirely surrounded by the water in tank A, and from this chamber or reservoir it may be drawn, as occasion requires, through a pipe, $G^2$, by attaching a pump to the top of the pipe. Pipe $G^2$ is also provided with a closely-fitting plug or screw-cap, in like manner as pipe $G^3$, which, besides serving to fill the gasoline-holder, also serves to withdraw the residuum from the bottom of the same by attaching a pump at its upper end.

In some cases it may be found desirable to use an imperforate false bottom, R', instead of or in conjunction with the foraminated bottom R, if it should be found that the lower carbureting-chamber E discharges too quickly or abundantly into the residuum holder or receiver Q; and, in that case, one or more narrow outlets are provided in the bottom plate, R', to permit the residuum to filter slowly down into the receiver Q.

The carbureting-chambers D and E are constructed with parallel partitions forming sinuous passages, which are provided with wicking or absorbents, of yarn or similar material, from which the air or gas fed into the chambers takes up or absorbs the hydrocarbon vapors, in the manner well understood and common to many machines of this class. For convenience, the absorbent material may be placed on reels between the partitions forming the sinuous passages; or it may be packed loosely into said passages, or arranged in any other desired manner, according to the nature of the absorbent material used. After the air or gas has been thoroughly carbureted in the chambers D and E, it passes through the discharge-pipe U up into the pressure-regulator V, which may be of any approved construction, and from this regulator it is distributed through a riser and connecting branch pipes to the burners. There are a number of pressure-regulators, patented and otherwise, which will be found well adapted for use in connection with my carburetor.

The tank or safety-jacket A is filled with water at a proper temperature through a feed-pipe, S, extending down to the bottom of the tank, and the top of the tank is provided with a vent-cock, W, to permit the air in the tank to escape as it is being filled with water.

It should have been stated above, in describing the operation of the automatic valve-and-feed mechanism, that a vertical partition, $h'$, is placed in the inner compartment, $H^2$, of box H, between the diaphragm $h$ and feed-pipe G', for the purpose of maintaining an even height or level of gasoline in the outer compartment, H', which is supplied through the automatic supply-valve I, and in which the float or regulator J works. As the gasoline rises to the top of this partition $h'$, which is a little lower than the parallel diaphragm or partition $h$, it overflows into chamber $H^2$, and is fed through pipe G' into the carbureting-chamber D, and from there through the overflow-pipe N into the lower carbureting-chamber, E, from which the surplus or residuum, as already stated, passes through the perforated bottom into the residuum holder or receiver Q in the bottom of the machine.

It is obvious that instead of the partition $h'$, just described, the inner end of pipe G', where it enters compartment $H^2$, may be bent upward parallel to partition $h$, to within a short distance of the top of the same, so as to operate as an overflow-pipe, through which the gasoline is fed from chamber $H^2$ into the upper carbureting-chamber.

Having thus described my invention, I claim and desire to secure by Letters Patent of the United States—

1. In combination with a carburetor, an outer casing or envelope adapted to contain a non-conducting filling or packing, open at its lower end, and provided with a sliding section closing said opening, substantially as shown and set forth.

2. The combination, in a carburetor, of the water-jacket or safety-jacket, the gasoline-holder, the carbureting-chambers, the automatic valve-and-feed mechanism, the residuum-receiver in the bottom of the machine, surrounded by the water in the safety-jacket, and the air or gas feed-pipe coiled around the gasoline-holder within the water-tank or safety-jacket, substantially as shown and set forth.

In testimony that I claim the foregoing as my own I have hereunto affixed my signature, in presence of two witnesses, this 29th day of December, 1883.

LOUIS BAGGER.

Witnesses:
AUGUST PETERSON,
ARTHUR L. MORSELL.